United States Patent [19]
Lewis et al.

[11] Patent Number: 6,020,842
[45] Date of Patent: Feb. 1, 2000

[54] ELECTRONIC SUPPORT MEASURES (ESM) DUTY DITHERING SCHEME FOR IMPROVED PROBABILITY OF INTERCEPT AT LOW ESM UTILIZATION

[75] Inventors: William L. Lewis, Manhattan Beach; Jeffrey A. Kardatzke, Hermosa Beach, both of Calif.

[73] Assignee: Raytheon Company, Lexington, Mass.

[21] Appl. No.: 09/176,562

[22] Filed: Oct. 21, 1998

[51] Int. Cl.[7] ........................................... G01S 7/36
[52] U.S. Cl. ............................ 342/13; 342/17; 342/162; 342/163
[58] Field of Search ..................... 342/13, 16, 17, 342/18, 19, 20, 88, 99, 98, 102, 192, 175, 194, 195, 205, 162, 163

[56] References Cited

U.S. PATENT DOCUMENTS

| | | | |
|---|---|---|---|
| 4,611,165 | 9/1986 | Nussbaum | 324/77 B |
| 5,132,689 | 7/1992 | Van Wyk | 342/96 |
| 5,523,760 | 6/1996 | McEwan | 342/89 |
| 5,677,927 | 10/1997 | Fullerton et al. | 375/200 |
| 5,687,169 | 11/1997 | Fullerton | 370/324 |
| 5,832,035 | 11/1998 | Fullerton | 375/210 |

FOREIGN PATENT DOCUMENTS

| | | | |
|---|---|---|---|
| 2228796 | 9/1990 | United Kingdom | G01R 23/14 |

OTHER PUBLICATIONS

"Waveform analysis for high–frequency FMICW radar", Khan, R.H.; Mitchell, D.K., Radar and Signal Processing, IEE Proceedings F, vol.: 138 , Oct. 5, 1991, pp.: 411–419.

"New processing techniques for ESM using partial coherence", Sutton, P., Signal Processing for ESM Systems, IEE Colloquium on, 1988, pp. 10/1–10/2.

"SAR systems resolution reviewed for target classification in knowledge–based environment", Martin, N.S., Electronic Technology Directions to the Year 2000, 1995. Proceedings., 1995, pp.: 177–183.

"Evaluation of classification performance for randomly dithered carrier centre frequency in SAR systems", Martin, N.S.; Jain, L.C.; Bolton, A.G., Electronic Technology Directions to the Year 2000, 1995. Proceedings., 1995, pp. 169–176.

"A technique for enhanced slant range resolution for SAR systems in knowledge–based environment", Bolton, A.G.; Martin, N.S.; Jain, L.C., IEEE Aerospace and Electronics Systems Magazine vol.: 9 , Aug. 8, 1994, pp.: 33–37.

*Primary Examiner*—John B. Sotomayor
*Attorney, Agent, or Firm*—Leonard A. Alkov; Glenn H. Lenzen, Jr.

[57] ABSTRACT

A duty dithering method for use with electronic support measures and radar warning receivers, and the like, that provides for improved probability of intercept at low utilization levels. The electronic support measures (ESM) system and radar warning receiver are controlled by a multi-system sensor manager having an ESM scheduler. In accordance with the present method, a maximum duty cycle is chosen for the ESM system. The chosen duty cycle is allocated to the ESM system each frame by the ESM scheduler. At the beginning of each frame, the ESM scheduler picks a random offset and subtracts it from the maximum duty to compute an ESM duty for that frame. The ESM scheduler commands data collections based on the computed duty for that frame. This step is repeated each frame.

2 Claims, 3 Drawing Sheets

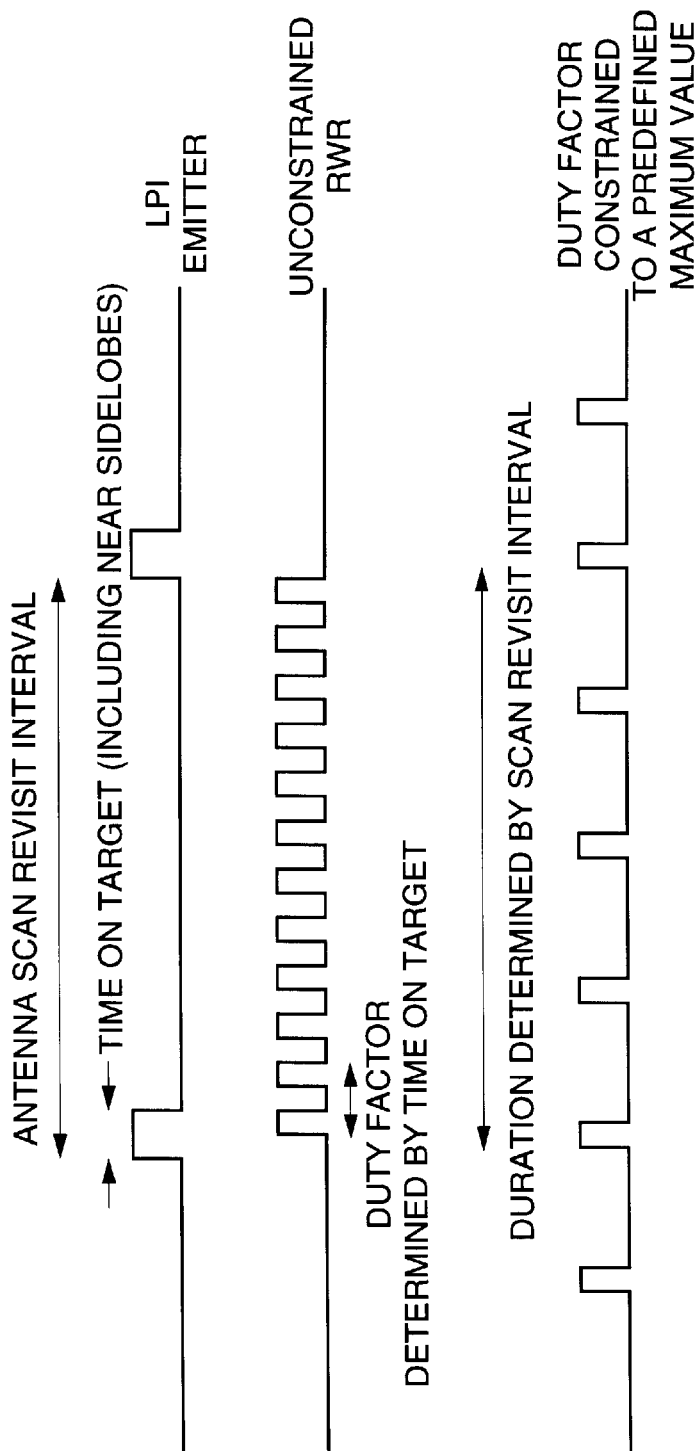

ELECTRONIC SUPPORT MEASURES (ESM) DUTY DITHERING SCHEME FOR IMPROVED PROBABILITY OF INTERCEPT AT LOW ESM UTILIZATION

BACKGROUND

The present invention relates generally to electronic support measures and radar warning receivers, and more particularly, to a duty dithering method for use with such systems that provides for improved probability of intercept at low utilization levels.

Electronic support measures (ESM) and radar warning receiver (RWR) systems typically have near isotropic antenna patterns to provide rapid intercept of emitter mainlobes. Therefore, data collection must be scheduled at rates fast enough to guarantee sampling of the emitter mainlobe as it flashes through the interceptors field-of-regard. This can lead to very high look duty factors for the intercepting ESM system when low ESM duty factors would be preferable, especially if the ESM system is part of a shared asset such as in a multi-function active array.

The prior art relates to electronic support measure systems having a fixed duty rate. The disadvantage of this type of system is the need for high ESM utilization in order to have a high probability of intercept. The reason for this was the occurrence of "blind zones" at certain duty factors. The occurrence of these "blind zones" is discussed below.

Accordingly, it is an objective of the present invention to provide for a duty dithering method for use with electronic support measures and radar warning receivers that provides for improved probability of intercept at low utilization levels.

SUMMARY OF THE INVENTION

To meet the above and other objectives, the present invention provides for a duty dithering method for use with electronic support measures (ESM) and radar warning receivers (RWR), and the like, that provides for improved probability of intercept at low utilization levels. The ESM duty dithering technique of the present invention replaces the prior art fixed ESM duty rate scheme and eliminates the "blind zones" that occur in prior art systems without sacrificing long range detection.

In a radar system that has an electronic support measures (ESM) component, ESM is allocated a certain percentage of operational time, which is referred to as the duty. The concept here is simply that for each system frametime that executes, an ESM scheduler chooses a duty less than or equal to its initial duty based on generation of a random number. Essentially, this prevents the ESM portion of the system from running at an exact periodic rate. This change in the period of when ESM operates helps prevent a phenomenon that occurs when an threat's scan rate has the same period as or is harmonically related to the ESM cycle and is illuminating the system with its mainlobe when the ESM is not running. This change in period allows this synchronization of the two to shift so that the mainlobe illumination then falls during the ESM run time.

In accordance with the principles of the present invention, two components of the electronic warfare (EW) timeline construction may be relaxed to reduce the data collection load and still maintain long range detection. These include (1) setting the repetition interval for intercept of the mainlobe and/or near sidelobes, and (2) allowing the possibility of missing intercept for some small number of threat frames. First and second sidelobe detection ranges are greater than 100 nmi for even the weakest threat emitters given ESM sensitivities <−65 dBmi. Since the ESM system detects at a long range, missing the main and/or inner sidelobes for a small number of frames does not degrade the quality of situational awareness or survivability provided by the ESM system.

Therefore, the emitter's mainlobe scan rate may be undersampled. By undersampling the emitter's scan rate, a phenomenon occurs, not unanalogous to medium pulse repetition frequencies (MPRF) blind zones, in which for certain look repetition rates, high probability of intercept occurs and for others very low probability of intercept. The technique of the present invention thus ensures that the ESM system is not operating in these "blind zones" for undersampled, low duty operation while maintaining high probability of intercept long range detection.

The present invention randomly dithers the duty of the ESM down by a certain percentage to allow for a relatively low duty factor while eliminating the "blind zone" phenomenon of ESM and the emitter scan being directly out of sync. The advantage is that the ESM system needs a much lower duty to run in while it still has the high probability of intercept that it previously had.

The present technique has significant utility when applied to an embedded interferometer ESM system that is part of a multi-function shared active array where resource allocation and interoperability issues dictate low resource loading for overall system effectiveness. Use of the present invention allows operation of an embedded interferometer system to detect threats at long ranges while requiring only a fraction of the multi-function array utilization load. This means that additional situational awareness and possible target tracking capability is realized at negligible cost to the effectiveness of the other sensor modes.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which:

FIG. 2 shows duty factor profiles relating to the present invention;

DETAILED DESCRIPTION

Figure 1:
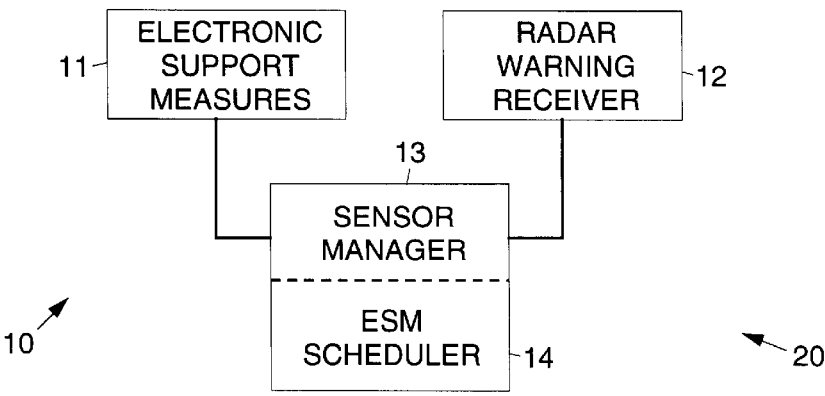
FIG. 1 shows a operational scenario illustrating a duty dithering method in accordance with the principles of the present invention.

Referring to the drawing figures, FIG. 1 shows a operational scenario illustrating a duty dithering method 20 in accordance with the principles of the present invention. The method 20 is used with an electronic warfare system 10 comprising electronic support measures (ESM) system 11 and a radar warning receiver 12. The electronic support measures system 11 and radar warning receiver 12 are controlled by means of a multi-system sensor manager 13 comprising an ESM scheduler 14. A threat 15 comprising an emitter 16, such as an active radar system, for example, is shown, wherein the emitter 16 illuminates the electronic warfare system 10.

FIG. 2 shows duty factor profiles relating to the present invention. The top trace in FIG. 2 shows the antenna scan revisit interval for the emitter 15 including the time on target (the threat 15), including near sidelobes. The next lower trace shows the duty factor for an unconstrained radar warning receiver 12. The duty factor is determined by the time on the target (the threat 15). The lowest trace shows a duty factor that is constrained to a predefined maximum value. In this instance, the radar warning receiver 12 may not see the target 15 and it may happen that the maximum allowed duty factor synchronizes (synchs up) with the antenna scan revisit interval (the upper trace) so radar warning receiver 12 will miss seeing the target over and over.

In order to overcome the limitations and problems of prior art systems and methods illustrated by FIG. 2, the present invention implements duty dithering method 20 that provides for improved probability of intercept of the target 15 at low utilization levels. An exemplary implementation of the present duty dithering method 20 is implemented as follows and for which a flow diagram is shown in FIG. 3.

Figure 3:
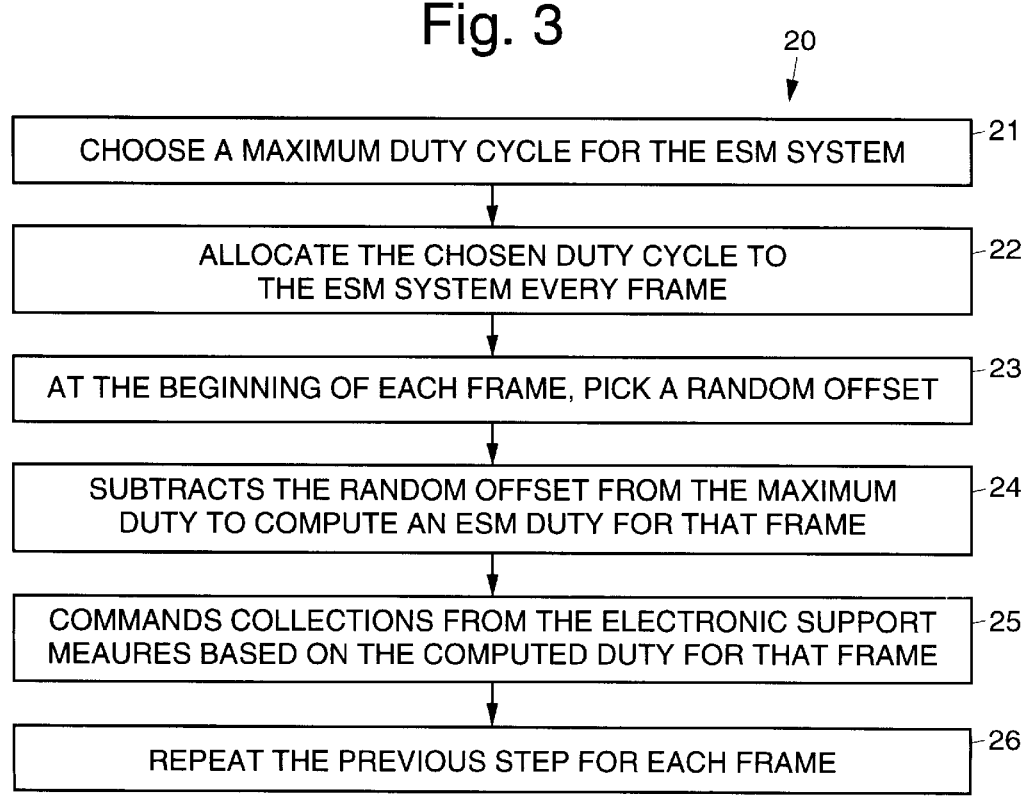
FIG. 3 is a flow diagram that illustrates an exemplary duty dithering method in accordance with the principles of the present invention.

Referring to FIG. 3, a maximum duty cycle is chosen 21 for the ESM system 11. This duty cycle is allocated 22 to the ESM system 11 every frame by the ESM scheduler 14 of the multi-system sensor manager 13. At the beginning of each frame, the ESM scheduler 14 picks 23 or selects 23 a random offset and subtracts 24 it from the maximum duty to compute 24 an ESM duty for that frame. The ESM scheduler 14 commands 25 data collections based on the computed duty for that frame. The data that is collected includes potential threat radar emissions. This step is repeated 26 every frame.

The random offset range should not go from a maximum duty factor to a zero duty factor. In practice, a range from maximum duty to 30% below maximum duty works well for an emitter scan rate of 60 degrees per second. Larger ranges ensure blind zone coverage while smaller ranges reduce time-to-intercept. An optimum range may be chosen given the scan rate of the emitter 16, maximum ESM duty, intercept beamwidth of the emitter 16, and frametime of the ESM scheduler 14. Uncertainty about the scan rate of the emitter 16 forces the ESM scheduler 14 to choose more conservative duty factor (higher) and offset range (larger) which leads to less than optimum performance. However, but still provides for very low duties and rapid time-to-intercept.

Figure 4:
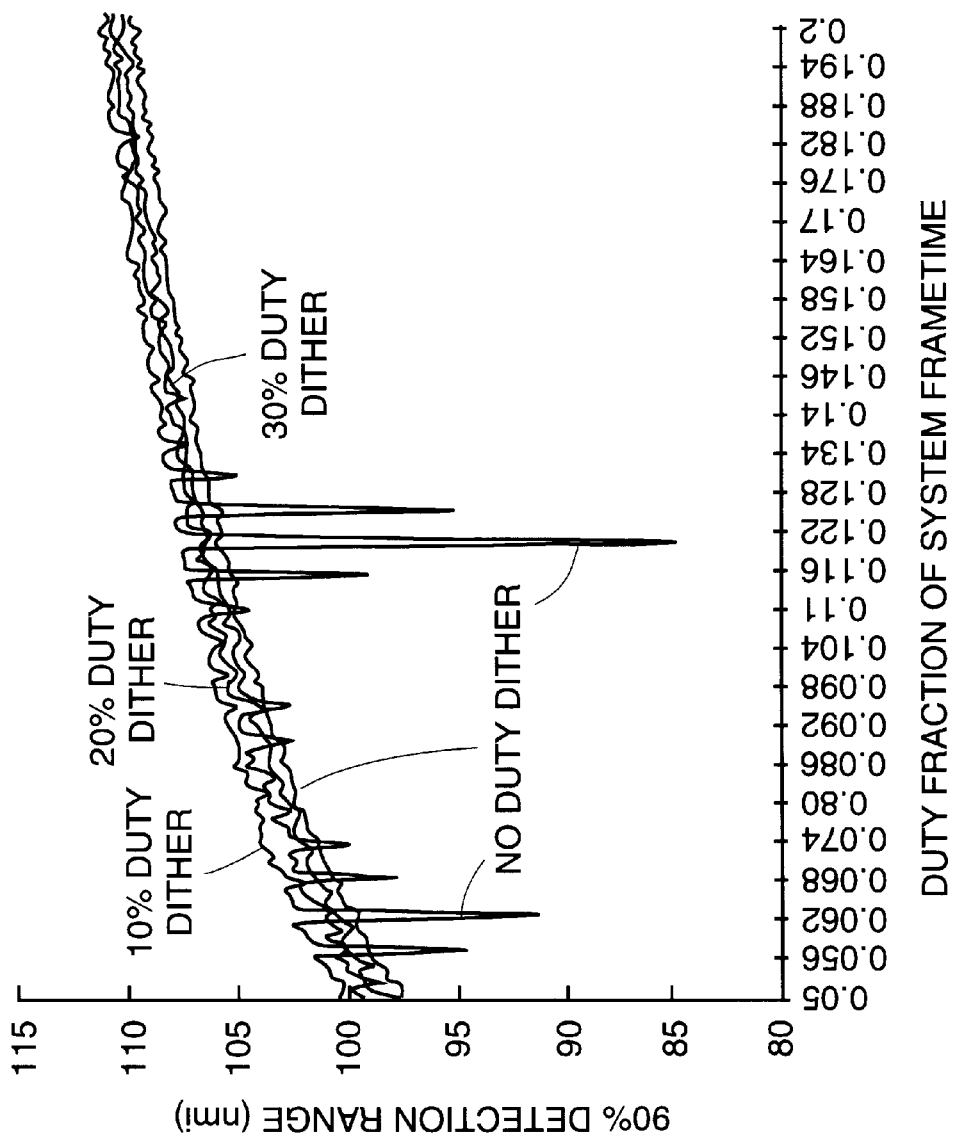
FIG. 4 show graphs that illustrates how dithering the duty factor by a certain percentage in accordance with the principles of the present invention eliminates blind zones that can occur by using low look rate duty factors.

The four graphs shown in FIG. 4 illustrates how dithering the duty factor by a certain percentage eliminates the "blind zones" that can occur by using low look rate duty factors. The graphs show detection range vs. ESM duty fraction for four different duty dither factors. The four separate lines are for duty dither factors of 0%, 10%, 20% and 30%, respectively. A 0% duty factor corresponds to not utilizing the duty dither feature of the present invention.

The data for these graphs were generated using an EW detection simulation that had the following input parameters using an embedded interferometer system: emitter ERP=60 dBw, emitter scan rate=60 deg/sec, emitter velocity=450 knots, interceptor sensitivity=−68 dBm, interceptor ESM frametime=10 msec, interceptor velocity=450 knots, start range=150 nmi. The geometry included having two aircraft fly a head-on course into one another and the frequency of the emitter 16 was assumed to always fall within the bandwidth of the radar warning receiver 12.

From the graphs of FIG. 4, it is evident that at low rate duty factors there are some duty values that have the "blind zone" phenomenon. Since the location of these blind zones primarily depends upon the scan rate of the emitter 16 which may not be known, there is always a chance that a low rate duty may fall into a blind zone. However, by dithering the duty at a high enough percentage, these blind zones are completely eliminated, and only a slight loss in detection range is the compromise.

Thus, an improved duty dithering method for use with electronic support measures and radar warning receivers has been disclosed that provides for improved probability of intercept at low utilization levels. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A duty cycle dithering method for use with electronic support measures (ESM) and radar warning receivers that provides for improved probability of intercept at low utilization levels, comprising the steps of:

choosing a maximum duty cycle for the ESM system;

allocating the chosen duty cycle to the ESM system every frame;

at the beginning of each frame, selecting a random offset for an ESM scheduler;

subtract the random offset from the maximum duty cycle to compute an ESM duty cycle for that frame;

commanding the ESM system to collect data based on the computed ESM duty cycle for that frame; and repeating the commanding step each frame.

2. The method recited in claim 1 wherein the random offset for the duty cycle from maximum duty cycle is up to about 30% below maximum duty cycle.

* * * * *